United States Patent
Browne et al.

(10) Patent No.: US 8,819,912 B2
(45) Date of Patent: Sep. 2, 2014

(54) METHOD OF ASSEMBLING WORKPIECES UTILIZING SHAPE MEMORY POLYMER ACTIVATION TO FACILITATE ALIGNMENT AND RETENTION

(75) Inventors: Alan L. Browne, Grosse Pointe, MI (US); Nancy L. Johnson, Northville, MI (US); Paul W. Alexander, Ypsilanti, MI (US); Nilesh D. Mankame, Ann Arbor, MI (US); Nicholas W Pinto, IV, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 13/415,220

(22) Filed: Mar. 8, 2012

(65) Prior Publication Data
US 2013/0232756 A1    Sep. 12, 2013

(51) Int. Cl.
*B29C 65/66* (2006.01)
*B29C 61/00* (2006.01)
*B23P 11/00* (2006.01)

(52) U.S. Cl.
USPC .................................... 29/428; 29/525

(58) Field of Classification Search
USPC .............................. 24/442, 448, 602; 428/100
See application file for complete search history.

(56) References Cited

U.S. PATENT DOCUMENTS

| | | | | |
|---|---|---|---|---|
| 4,932,642 | A * | 6/1990 | Salenbien et al. | 269/133 |
| 7,836,564 | B2 * | 11/2010 | Barvosa-Carter et al. | 24/442 |
| 7,866,737 | B2 * | 1/2011 | Browne et al. | 296/193.1 |
| 2008/0141736 | A1 * | 6/2008 | Jones et al. | 70/77 |
| 2008/0236720 | A1 * | 10/2008 | Sigler et al. | 156/73.5 |
| 2009/0159624 | A1 * | 6/2009 | Johnson et al. | 224/316 |
| 2012/0213969 | A1 * | 8/2012 | Mather et al. | 428/156 |

* cited by examiner

Primary Examiner — Alexander P Taousakis
Assistant Examiner — Lee A Holly

(57) ABSTRACT

A method of adaptively assembling first and second workpieces utilizing shape memory polymer activation to facilitate alignment and retention, wherein the workpieces present and the method employs at least one active nub and/or mated receptacle, and the modulus shifting and shape memorization capabilities of shape memory polymer are alternatively used to further engage the nub and receptacle during assembly.

15 Claims, 3 Drawing Sheets

METHOD OF ASSEMBLING WORKPIECES UTILIZING SHAPE MEMORY POLYMER ACTIVATION TO FACILITATE ALIGNMENT AND RETENTION

BACKGROUND OF THE INVENTION

1. Field of the Invention

The present disclosure relates to methods of assembling workpieces, and more particularly, to an adaptive method of using shape memory polymer activation to align and retain assembled workpieces.

2. Discussion of Prior Art

In the manufacturing and industrial arts, proper assembly of workpieces relies increasingly upon programmable robotics, and complex aligning fixtures to achieve the necessary precision. For example, whereas conventional welding of workpieces require the formation of precise seam and spot welds to ensure desired structural performance and aesthetics, a long felt need involves positioning a manipulable workpiece within a tight tolerance prior to affixing to a stationary workpiece. Such tolerances, however, make it difficult to properly position the workpiece, and often result in misalignment and/or mechanical binding, which further result in downtime, damage to workpieces and/or infrastructure, as well as incurred expenses. Moreover, conventional assembly systems typically present one-size-fits-all alignment systems that do not adapt to dimensional variations from workpiece to workpiece, which may further result in misalignment and binding, even where robotic precision is employed.

BRIEF SUMMARY OF THE INVENTION

Responsive to these and other concerns, the present invention involves a method of using shape memory polymer (SMP) activation to align and retain assembled workpieces. The invention is useful for facilitating part alignment and subsequent retention, greatly reducing the requirements of infrastructure, such as complex aligning fixtures. The invention is further useful for accommodating variations in part dimensions, while not sacrificing the strength of the ultimate attachment, especially to disengagement by shear. The inventive method is self-aligning, and can tolerate fairly poor initial alignment. By using soft polymeric material during initial contact and re-positioning, marring of workpiece surfaces is also reduced. The invention utilizes the abilities of shape memory polymer to temporarily undergo large strains in its low modulus state, and recover its original shape, which offer many advantages over conventional actuators, including, for example, fewer moving parts, lower energy consumption, and reduced noise (both acoustically and with respect to EMF). Lastly, the high stiffness low temperature state of shape memory polymer provides for high stiffness lateral retention of the workpieces, once aligned. Thus, no trade off between adaptation and strength during assembly is required.

In general, the invention presents a method of adaptively assembling first and second workpieces utilizing shape memory polymer activation to facilitate alignment or alignment plus retention. The workpieces present at least one nub and define at least one receptacle configured to receive the nub during assembly, wherein the nub and/or receptacle comprise shape memory polymer of suitable shape, size, and morphology to effect the intended function of the invention. The method includes applying a normal load to the workpieces, so as to cause the nub to generally engage the receptacle, and activating the polymer by exposing the nub and/or receptacle to a suitable activation signal. The nub is caused to further engage the receptacle, as a result of activating the polymer. Next, the polymer is deactivated by occluding the polymer from the signal, and the workpieces are further aligned as a result thereof.

Other aspects of the disclosure, including using shape memory polymer activation to retain the workpieces once aligned, may be understood more readily by reference to the following detailed description of the various features of the disclosure and the examples included therein.

BRIEF DESCRIPTION OF THE DRAWINGS

Preferred embodiments of the invention are described in detail below with reference to the attached drawing figures of exemplary scale, wherein.

DETAILED DESCRIPTION

Figure 3:
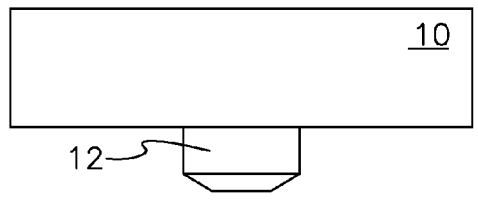
FIG. 3 is a side elevation of a workpiece comprising a chamfered nub, in accordance with a preferred embodiment of the invention.
Figure 4:
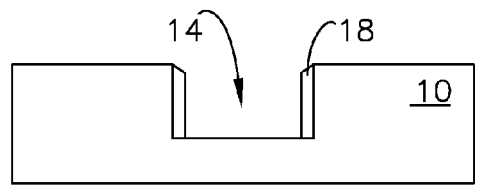
FIG. 4 is a side elevation of a workpiece including a chamfered shape memory polymer grommet defining a receptacle, in accordance with a preferred embodiment of the invention.
Figure 5A:
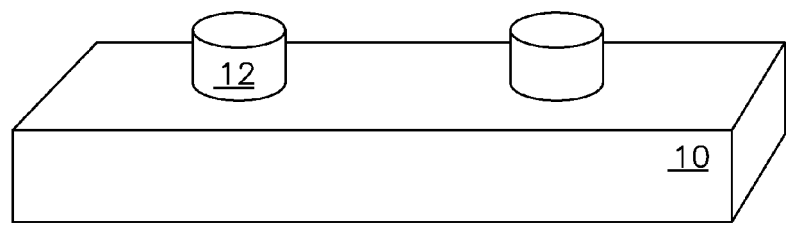
FIG. 5a is a perspective view of a workpiece comprising first and second shape memory polymer nubs in a first geometric shape, in accordance with a preferred embodiment of the invention.
Figure 5B:
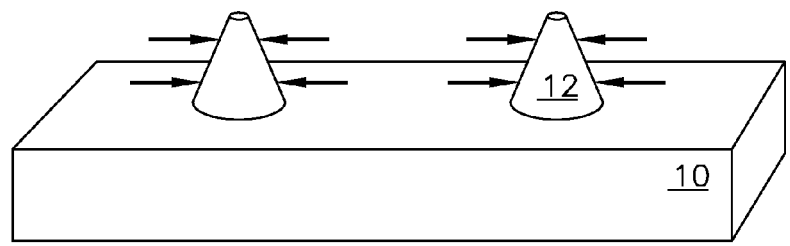
FIG. 5b is a perspective view of the workpiece shown in FIG. 5a, wherein the nubs have been activated, re-shaped, and allowed to deactivate by cooling prior to assembly.
Figure 5C:
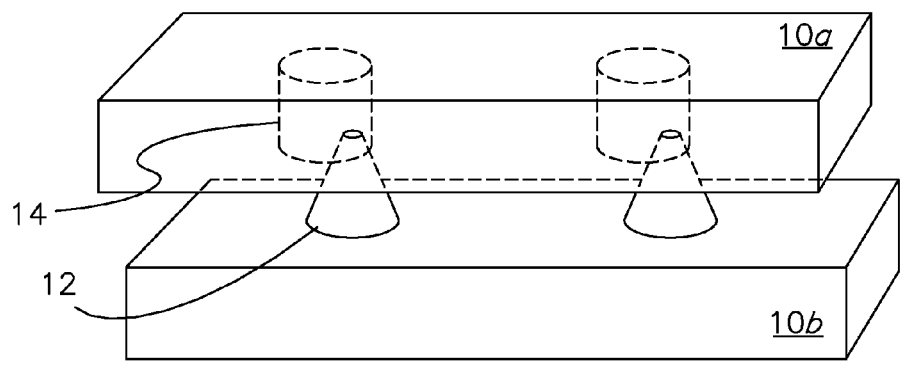
FIG. 5c is a perspective view of a second workpiece defining receptacles mated to the first shape shown in FIG. 5a, and receiving within the receptacles at least a portion of the re-shaped nubs shown in FIG. 5b though misaligned therewith.
Figure 5D:
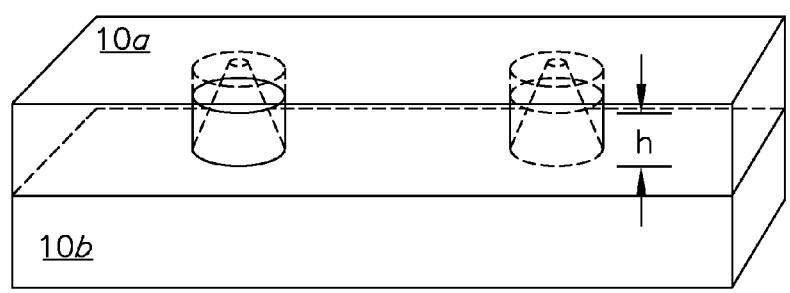
FIG. 5d is a perspective view of the workpieces shown in FIGS. 5a-c, wherein the nubs have been fully inserted within the receptacles, and caused to revert to their first shape, so as to assist in aligning and retaining the workpieces.

With reference to FIGS. 1-5d, the present invention discloses an improved method of aligning and fixing workpieces 10a,b that utilize shape memory polymer (SMP) or equivalent smart material activation to effect the same. More particularly, the invention presents a method of using one or more nubs 12 (i.e., projections, prongs, struts, supports, etc.) and/or receptacles or holes 14 comprising and defined by shape memory polymer to facilitate alignment and further, in a preferred embodiment, to retain the workpieces in a properly aligned condition (FIGS. 1c, and 5d). The invention may be used wherever workpieces (i.e., parts, bodies, subassemblies, etc.) are desired to be assembled according to a specified correlative alignment, such as, for example, in an automotive setting to improve and streamline a door or quarter-panel assembly process.

The inventive method is described and illustrated in two different classes of embodiments: a first, wherein the lower modulus state of SMP enables alignment followed by the higher modulus state after alignment to provide high stiffness lateral position hold without lateral freedom (i.e., "slop"); and a second, wherein the shape setting capability of SMP allows the creation and setting of a self-aligning geometry prior to assembly, provides positive registering or tight engagement by triggering the shape memory effect in the low modulus state after alignment, and then provides a high stiffness lateral position hold by switching to the high modulus state. However, it is intended for the following description of the preferred embodiments to be merely exemplary in nature and in no way limited to the configurations, application, and uses disclosed.

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to an activation signal. As previously mentioned, shape memory polymer is particularly suited for use in the present invention.

Shape memory polymers (SMP's) generally refer to a group of polymeric materials that demonstrate the ability to return to a previously defined shape when subjected to an appropriate stimulus. Thermally-activated shape memory polymers are polymers whose elastic modulus changes substantially (usually by one-three orders of magnitude) across a narrow transition temperature range, e.g., 0 to 150° C., depending upon the composition of the polymer, and which exhibit a finite rubbery plateau in the elastic response at temperatures above the transition range where the modulus remains fairly constant.

In addition to the elastic modulus, properties such as permeability to moisture, and refractive index also exhibit a significant change across the transition temperature range. Shape memory polymers activated by other stimuli, such as light and humidity, show a similar behavior wherein the change in properties occurs over a range of or corresponding to finitely separated discrete values of the specific stimulus. These properties are the result of morphology of the polymer, which contains chains of atoms that are connected by two types of cross-links: irreversible and reversible. The latter can be broken by supplying sufficient thermal energy to raise the temperature of the polymer above the transition range in thermally-activated SMPs. In this condition, the chains in the polymer are held together only by the irreversible cross-links. Hence, the elastic modulus of the polymer is low and the material can be stretched to high strains (e.g. up to 300%). Due to a reduction in cross-links the polymer chains can move relative to each other by significant distances to accommodate the large strains without causing breakage of the reversible cross-links, and hence, without plastic failure. If this deformation is maintained while the polymer is cooled to a temperature below the transition range, the reversible cross-links are formed between the polymer chains in their new positions. The increased density of cross-links constrains the relative motions of the polymer chains and thus, increases the stiffness of the material. The newly formed reversible cross-links serve to lock in the deformation imparted to the polymer above the transition range.

Experiments have shown that the polymer can retain the deformed shape for extended periods of time (e.g., up to 6 months) as long as they are loaded within the elastic limit of the polymer below the transition range and the material temperature does not rise into or above the transition range. Subsequent heating of the polymer above the transition range causes the reversible cross-links to break, and if the material is free of external loads, to recover previously induced deformation above the transition range. The strain recovery is often nearly complete (e.g., 98% or more). Thus, SMPs can be imparted temporary shapes by deforming them above the transition range and cooling them below the transition range. The original shape can be recovered simply by heating the polymer above the transition range in the absence of external loads.

Depending on the nature of the polymer morphology a wide variety of SMPs can be formed. One way of classifying SMPs is based on the nature of the cross-links. The irreversible cross-links in thermoset SMPs are formed by covalent bonds. Thermoplastic SMPs do not have truly irreversible cross-links. They have two or more types of reversible cross-links that are formed and broken over finitely separated temperature ranges. Any of the temperature ranges across which the polymer behaves in the manner specified above can be treated as a transition range for the material. Typically, the lowest temperature range that falls within the range of normal operating conditions for the material is used as the transition range. When the material is heated above its transition range only the cross-links corresponding to this range and all lower ranges are broken. The cross-links that break and form at higher temperatures are unaffected, and play the role of irreversible cross-links in this class of SMP.

Reversible cross-links are secondary bonds that consist of H-bonds, ionic bonds, and van der Waals forces, which can cause linear chain molecules, especially those with the same tactility and negligible pendant groups, to crystallize. Irreversible cross-links produce entanglement and covalent cross-links, and may be reversible for some photo-activated SMPs. The backbone may be a thermoplastic (i.e., basically a one-dimensional covalent network of linear molecules). The links in the backbone are not cross-links, but rather are links between non-adjacent atoms in the chain. Thus, instead of a one-dimensional network, a non-cross-linked network is presented that flows easily when heated above a softening temperature due to the one-dimensional nature, which promotes relative sliding between backbone chain segments. As such, the polymer can be reshaped easily by heating above a softening temperature.

In thermoset SMPs, a three-dimensional covalent network presents a cross-linked network that does not flow when heated. Instead it burns or chars above a characteristic temperature because the three-dimensional covalent network restricts the motion of backbone chain segments. As such, better structural properties, as well as heat and chemical resistance is provided. In thermoplastic SMPs, the original/permanent shape is set by physical cross-links produced by the hard segment; whereas in thermoset SMPs, there may be no hard segment. The permanent shape is set by forming covalent cross-links between the (soft) segments.

Suitable polymer components to form a shape memory polymer include, but are not limited to, polyphosphazenes, poly(vinyl alcohols), polyamides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly (octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone)dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

Returning to FIGS. 1a-c, a first embodiment or class of the invention presents a method of adaptively assembling first and second workpieces 10a,b utilizing shape memory polymer modulus shifting capability to facilitate alignment or alignment plus retention. In this configuration, the workpieces 10a,b present at least one, and more preferably, a plurality of nubs 12 and receptacles 14 configured to receive the nubs 12 during assembly. The nubs 12 and/or receptacles 14 are formed of and defined by shape memory polymer 16 having a memorized shape and a glass transition temperature above the normal operating (e.g., ambient) temperature. That is to say, the nubs 12 and/or receptacles 14 are preferably maintained in a deactivated state prior to use. They may be integrally formed of SMP 16, or a blend of active and non-active components. With respect to the receptacle 14, it is appreciated that the workpiece 10 comprises SMP adjacent the cavity or is drivenly coupled to the exterior surface defined thereby.

In a first configuration, the workpiece 10 includes a grommet 18 (FIG. 4) formed of SMP 16, and the grommet 18 defines the receptacle 14. The nub 12 and/or grommet 18 may be formed of an SMP blend or composite, wherein the SMP presents a matrix, or the filler material to a non-active matrix. For example, the nub 12 and/or grommet 18 may be formed by a composite consisting of an SMP matrix and carbon nanofibers or carbon nanotubes (CNF/CNT) fillers. It is appreciated that the CNF/CNT fillers are receptive to infrared radiation, and able to absorb the radiation and dissipate it as heat energy. Lastly, it is appreciated that the nub 12 and/or grommet 18 may comprise a blend of multiple shape memory polymers 16 having distinct glass transition ranges, memorized shapes, and/or activation signal types to provide flexibility.

Figure 1A:
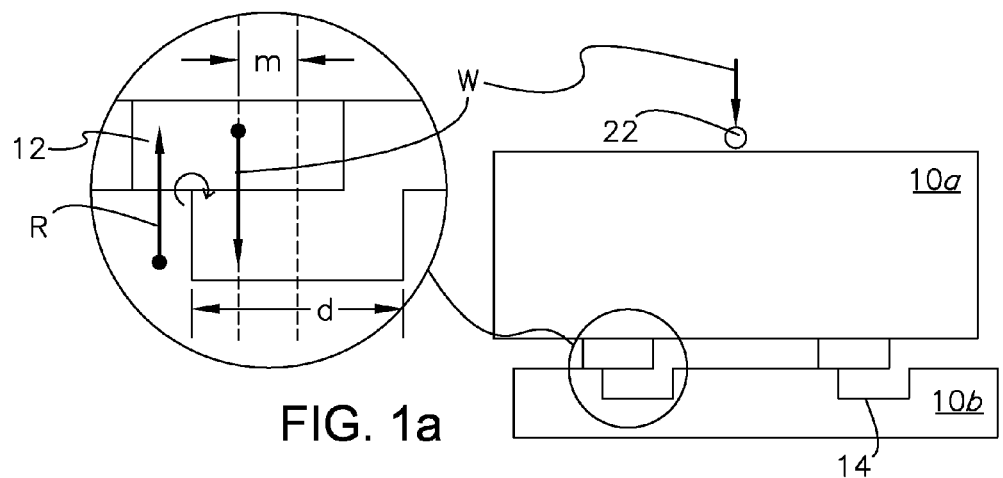
FIG. 1a is a side elevation of a free workpiece having shape memory polymer nubs and engaging a fixed workpiece defining receptacles, wherein the workpieces have been misaligned, and an enlarged caption view of the forces acting upon the nubs as a result of misalignment, in accordance with a preferred embodiment of the invention.
Figure 1B:
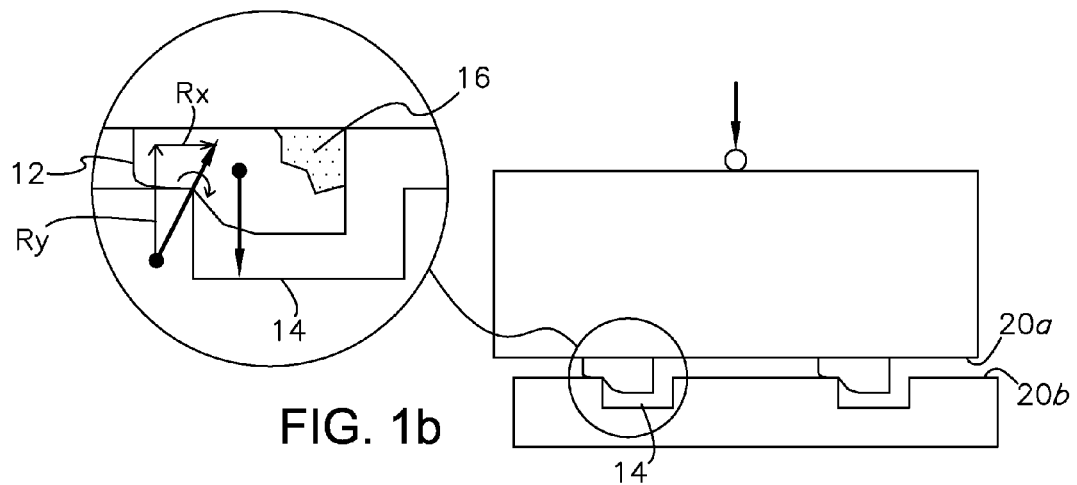
FIG. 1b is a side elevation of the workpieces shown in FIG. 1a, wherein the SMP nubs have been activated and deformed under the load, and an enlarged caption view of the forces acting upon the nubs in this condition.
Figure 1C:
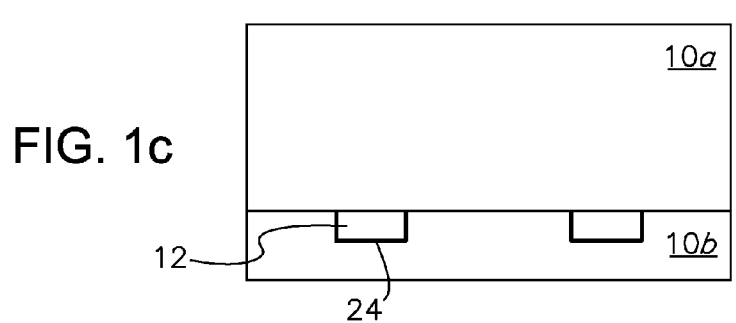
FIG. 1c is a side elevation of the workpieces shown in FIGS. 1a-b, wherein the workpieces have been re-positioned as a result of the lateral and therefore aligning component of the force vector acting on them resulting from the deformation of the SMP, such that the nubs are received in the receptacles and allowed to regain their shape.
Figure 2:
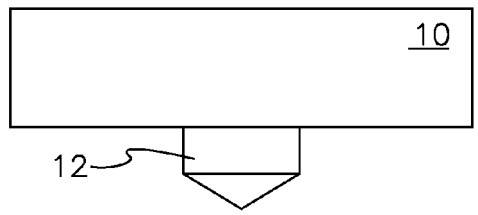
FIG. 2 is a side elevation of a workpiece comprising a tapered nub, in accordance with a preferred embodiment of the invention.

The nubs 12 and receptacles 14 may present any cross-sectional shape (e.g., circular, rectangular, etc.) provided that they present congruent diameters/widths, and are cooperatively configured to allow tipping as further described below. More particularly, it is appreciated that the nub 12 presents a diameter slightly (e.g., 0.5-1%) smaller than the receptacle 14 so as to enable entry but minimize lateral freedom when inserted. Where fully received, the preferred nub 12 and receptacle 14 are cooperatively configured such that adjacent surfaces 20a,b defined by the workpieces 10a,b form superjacent layers (FIG. 1c).

In operation, the free workpiece 10a is manipulated so as to be positioned adjacent the fixed workpiece 10b in a manner that causes the nub(s) 12 to enter the receptacle(s) 14. A normal load vector, W, is then applied that causes the workpieces 10a,b to bear against one another via the nubs 12 (FIG. 1a). The load may be the weight of the free workpiece 10a, an external load, such as a clamping force, or the weight plus a clamping force, etc. Where the weight of the workpiece 10a is utilized, it is appreciated that the load may be passively applied. More preferably, the load, where external, is applied through rolling engagement, so as to facilitate lateral displacement and alignment. For example, it is appreciated that one or more rollers or ball bearings 22 may be used to apply the load (FIGS. 1a-c).

Thus, the nub 12 is initially caused to generally engage the receptacle 14, wherein the term "generally engaged" means that the nub 12 is physically positioned so that at least a portion thereof is within or adjacent the cavity, and the centroid of the nub 12 is within the vertical boundaries of the receptacle 14. In this condition, it is appreciated that the incompressible nature of the nub 12 causes a normal resultant vector, R, parallel to the load vector, W, which adds to the moment at the engaged edge of the receptacle 14 (FIG. 1a). A misalignment of m produces a net tipping moment of M=W (d−m)/2, where W is the force pushing the workpieces 10a,b together, and d is the diameter/width of the receptacle 14. It is appreciated that, in a singular nub configuration, the moment works to tip the free workpiece 10a relative to the fixed workpiece 10b; and that in the tipped condition, the distance between an angular R and the moment axis is reduced (FIG. 1b). As a result, the effective misalignment and moment are also reduced and a lateral vector component $R_x$ is created that drives the nub 12 into the receptacle 14. To facilitate the production of an angular R, the nub 12 and/or receptacle 14 may be tapered (FIG. 2) or chamfered (FIGS. 3 and 4).

Where plural nubs 12 and receptacles 14 are generally engaged but misaligned, such that a portion of each nub 12 sits upon the exterior surface 20b defined by the fixed workpiece 10b (FIGS. 1a,b), the SMP-comprised nub 12 and/or receptacle 14 is activated to achieve a lower modulus state. In the lower modulus state, the nubs 12 and/or receptacles 14 are able to flex/deform under the load, thereby creating an angular R without tipping the workpiece 10a. As compression progresses under the load, an increasingly angular R is maintained causing further engagement until the nub 12 fully enters and is aligned (i.e., registers) with its respective receptacle 14. It is appreciated that in this action, the invention works to reduce potential energy in the assembly. Once the nubs 12 are in the receptacles 14, the deformed nubs 12 and/or receptacles 14 are able to recover their shape elastically, while the polymer 16 is still in its low modulus state. Thus, the anticipatory loading and the compressive strength of the activated SMP 16 must be cooperatively determined. The nubs 12 and/or receptacles 14 are then deactivated, allowing the SMP 16 to recover its high modulus stiffness, wherein it serves as a lateral hold that locks the two workpieces 10a,b together.

Activation is accomplished by exposing the polymer 16 to a signal of sufficient magnitude and duration to allow the performance of the afore-mentioned steps. Though described herein with respect to thermally activated SMP, it is within the ambit of the invention to utilize shape memory polymer 16 responsive to other types of signals, such as moisture (e.g., water), ultra-violet radiation, and radio-frequency signals. The SMP 16 may be passively exposed to the signal, where the signal is a by-product of an external process (e.g., heat energy generated during an oven curing process, or stored therefrom), or promulgated through sequenced on-demand field activation. For example, it is appreciated that moisture activated SMP may be caused to go through a blank wash, UV-activated SMP may be exposed to artificial lighting, and RF-activated SMP may be exposed to suitably radiating equipment, such as weld guns, etc.

In a second embodiment of the invention, the method utilizes the shape memorization capability of SMP to facilitate alignment or alignment plus retention. In this configuration, the nub 12 or receptacle 14 presents a first lateral shape, and is caused, through activation, to achieve a second previously memorized lateral shape. In the first lateral shape, alignment is facilitated, such that the required precision during initial positioning is reduced. By causing the nub 12 or receptacle 14 to achieve the second shape when generally engaged with the other, the free workpiece 10a is caused to laterally translate and/or become retained in a laterally fixed condition relative to the fixed workpiece 10b.

For example, and as shown in FIGS. 5a-d, the fixed workpiece 10b may present first and second nubs 12 comprising SMP 16 having a glass transition temperature greater than ambient temperature and presenting initial memorized (e.g., cylindrical) shapes (FIG. 5a). The nubs 12 are preformed to a second (e.g., conical) shape by heating the nubs 12 past their transition temperature range, inelastically molding them, and allowing them to cool, so as to stiffen and lock in the achieved shape (FIG. 5b). It is appreciated that a heated press may be employed for this task. A free workpiece 10a defining first and second receptacles 14 may then be positioned atop the fixed workpiece 10b. The receptacles 14 are geometrically configured to form a tight engagement with the nubs 12 in their initial shapes, when inserted therein. In the second or achieved shape, at least a portion of the nubs 12 is facilely insertable within the receptacle 14 (FIG. 5c). More preferably, the achieved shape of the nubs 12 is further configured to cause alignment during insertion. In the illustrated embodiment, for example, the tapered walls of the conical shape cause a lateral workpiece displacement linearly proportional to the depth of insertion, as the nub 12 engages the perimeter of the receptacle 14.

Once the nub 12 is inserted within the receptacle 14 a minimum depth, h, the nub 12 is activated, so as to be caused to revert back to the initial memorized shape. More preferably, h is equal to the full height of the nub 12, such that the workpiece surfaces 20a,b are caused to form superjacent layers (FIG. 5d). By reverting back to the memorized shape, the nubs 12 work to align the workpieces 10a,b, and where the memorized shape attempts to achieve a dimension (e.g., diameter) greater than the congruent dimension of the receptacle 14, further works to retain the workpieces 10a,b in the aligned condition. The SMP 16 is then cooled to lock in the aligned condition.

Finally, to facilitate assembly, especially where the SMP 16 is activated, it is appreciated that the nub 12 and/or receptacle 14 may be lined with a low-friction coating or lubricant (e.g., Teflon, grease, etc.) 24, so as to overlay the polymer 16 when the workpieces 10a,b inter-engage (FIG. 1c).

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. As used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement are inclusive of the endpoints and independently combinable.

What is claimed is:

1. A method of adaptively assembling first and second workpieces utilizing shape memory polymer activation to facilitate alignment, wherein the first workpiece presents at least one nub and the second workpiece defines at least one receptacle configured to receive the nub during assembly, and the nub, the receptacle, or both the nub and receptacle include a shape memory polymer, said method comprising the steps of:

a. applying a normal load to the workpieces, so as to cause a portion of the nub of the first workpiece to sit upon an exterior surface of the second workpiece and adjacent to a vertical boundary of its respective receptacle, whereby the nub and the receptacle are misaligned;

b. activating the shape memory polymer by exposing the nub, the receptacle, or both the nub and the receptacle to an activation signal, thereby causing the nub, the receptacle, or both the nub and the receptacle to achieve a lower modulus state;

c. continuing to apply the normal load while the nub, the receptacle, or both the nub and the receptacle is/are in the lower modulus state, thereby i) causing the nub, the receptacle or both the nub and the receptacle to deform from an original shape and ii) creating a reaction force non-parallel to a force of the normal load, the reaction force causing the nub to fully enter and align with the respective receptacle, wherein the nub, the receptacle, or both the nub and the receptacle elastically recover the original shape once the nub fully enters the respective receptacle;

d. aligning the first and second workpieces as a result of performing steps a) through c); and e. deactivating the shape memory polymer by occluding the shape memory polymer from the activation signal, thereby causing the nub, the receptacle, or both the nub and the receptacle to achieve a higher modulus state and to serve as a lateral hold that locks the first and second workpieces together.

2. The method as claimed in claim 1, wherein step b) includes the step of exposing the shape memory polymer to a predetermined thermal energy signal.

3. The method as claimed in claim 1, wherein step b) includes the step of exposing the shape memory polymer to a predetermined moisture signal.

4. The method as claimed in claim 1, wherein step b) includes the step of exposing the shape memory polymer to a predetermined amount of ultra-violet radiation.

5. The method as claimed in claim 1, wherein step b) includes the step of exposing the shape memory polymer to a predetermined radio-frequency signal.

6. The method as claimed in claim 1, wherein step b) further includes the step of passively exposing the shape memory polymer to a signal, and wherein the signal is a by-product of an external process.

7. The method as claimed in claim 1, wherein step c) reduces potential energy during the assembling of the first and second workpieces.

8. The method as claimed in claim 1, wherein the normal load in steps a) and c) is applied through rolling engagement.

9. The method as claimed in claim 1, wherein the shape memory polymer integrally presents the nub.

10. The method as claimed in claim 1, wherein the shape memory polymer is present as a grommet that defines the receptacle.

11. The method as claimed in claim 1, wherein the shape memory polymer presents a matrix that forms the nub, the receptacle, or both the nub and the receptacle.

12. The method as claimed in claim 11, wherein the matrix further comprises carbon nanofibers or carbon nanotubes.

13. The method as claimed in claim 1, wherein the nub, the receptacle, or both the nub and the receptacle comprises a non-active matrix and a filler material, and wherein the shape memory polymer presents the filler material.

14. The method as claimed in claim 1, wherein a low-friction coating lines the nub, the receptacle, or both the nub and the receptacle such that the low-friction coating overlays the shape memory polymer when the first and second workpieces are assembled.

15. The method as claimed in claim 1, wherein the nub, the receptacle, or the nub and receptacle comprise a blend of multiple shape memory polymers having any of distinct glass transition ranges, distinct memorized shapes, distinct activation signal types, or combinations thereof.

* * * * *